United States Patent
Arai et al.

(10) Patent No.: US 9,272,701 B2
(45) Date of Patent: Mar. 1, 2016

(54) PLUG-IN HYBRID VEHICLE

(75) Inventors: Mikihisa Arai, Toyota (JP); Masaya Yamamoto, Kasugai (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 59 days.

(21) Appl. No.: 14/368,619

(22) PCT Filed: Dec. 28, 2011

(86) PCT No.: PCT/JP2011/080389
§ 371 (c)(1),
(2), (4) Date: Jun. 25, 2014

(87) PCT Pub. No.: WO2013/098990
PCT Pub. Date: Jul. 4, 2013

(65) Prior Publication Data
US 2014/0350764 A1    Nov. 27, 2014

(51) Int. Cl.
*B60L 9/00* (2006.01)
*B60W 20/00* (2006.01)
(Continued)

(52) U.S. Cl.
CPC .......... *B60W 20/106* (2013.01); *B60L 11/1861* (2013.01); *B60W 10/06* (2013.01); *B60W 10/08* (2013.01); *B60W 10/26* (2013.01); *B60W 20/00* (2013.01); *B60W 20/104* (2013.01); *B60W 40/10* (2013.01); *B60W 2050/0083* (2013.01); *B60W 2050/0089* (2013.01); *B60W 2710/244* (2013.01); *Y02T 10/6269* (2013.01);
(Continued)

(58) Field of Classification Search
CPC .............. B60W 20/106; B60W 2710/244; B60W 20/104; B60W 40/10; B60W 2050/0083; B60W 2050/0089; B60W 10/06; B60W 20/00; B60L 11/1861; Y10S 903/903; Y10S 903/93; Y02T 10/6269; Y02T 90/14
USPC ............. 701/22; 180/65.29, 65.265; 903/903, 903/930
See application file for complete search history.

(56) References Cited

U.S. PATENT DOCUMENTS 8,229,615 B2 * 7/2012 Sakamoto .............. B60K 6/365
180/65.21
8,620,501 B2 * 12/2013 Watanabe .............. B60K 6/445
701/110
(Continued)

FOREIGN PATENT DOCUMENTS

JP    2010-179749    8/2010
JP    2010-280250    12/2010
(Continued)

*Primary Examiner* — Helal A Algahaim
*Assistant Examiner* — Shardul Patel
(74) *Attorney, Agent, or Firm* — Finnegan, Henderson, Farabow, Garrett & Dunner, LLP

(57) ABSTRACT

In an electric-mileage learning when a running mode of a plug-in hybrid vehicle is a CD mode, acquisition of information for the electric-mileage learning is not performed in the case where the running mode is changed from the CD mode to a CS mode during one trip even when the running mode is changed to the CD mode afterward. The electric-mileage learning is performed by calculating a trip electric mileage using only information acquired in the CD mode before a change to the CS mode for the first time. This avoids inclusion of an error caused by running on the uphill road in the CS mode in a learned electric mileage even when the running is performed. This enhances the accuracy of the learned electric mileage, thus accurately calculating a possible EV running distance.

10 Claims, 7 Drawing Sheets

(51) Int. Cl.
*B60W 40/10* (2012.01)
*B60L 11/18* (2006.01)
*B60W 10/06* (2006.01)
*B60W 10/08* (2006.01)
*B60W 10/26* (2006.01)
*B60W 50/00* (2006.01)

(52) U.S. Cl.
CPC .............. *Y02T 90/14* (2013.01); *Y10S 903/903* (2013.01); *Y10S 903/93* (2013.01)

(56) References Cited

U.S. PATENT DOCUMENTS

| | | | | |
|---|---|---|---|---|
| 8,694,187 B2* | 4/2014 | Yamazaki | ............. | B60K 6/365 701/22 |
| 8,831,803 B2* | 9/2014 | Yamamoto | ............. | B60K 6/445 180/165 |
| 9,097,231 B2* | 8/2015 | Watanabe | ............. | B60K 6/445 |
| 2007/0029121 A1* | 2/2007 | Saitou | ...................... | B60K 6/46 180/65.285 |
| 2008/0219866 A1* | 9/2008 | Kwong | ................... | B60K 6/46 417/410.1 |
| 2010/0204863 A1 | 8/2010 | Sakamoto et al. | | |
| 2011/0257823 A1 | 10/2011 | Watanabe | | |
| 2012/0150374 A1 | 6/2012 | Yamazaki et al. | | |
| 2014/0076104 A1 | 3/2014 | Watanabe | | |
| 2014/0081502 A1 | 3/2014 | Watanabe | | |
| 2014/0358349 A1* | 12/2014 | Okuda | ................... | B60K 6/445 701/22 |

FOREIGN PATENT DOCUMENTS

| | | |
|---|---|---|
| JP | 2011-51395 | 3/2011 |
| JP | 2011-225097 | 11/2011 |
| JP | 2013-147206 | 8/2013 |
| JP | 2013-162618 | 8/2013 |
| WO | WO 2011/024038 A | 3/2011 |

\* cited by examiner

PLUG-IN HYBRID VEHICLE

CROSS-REFERENCE TO RELATED APPLICATIONS

This application is a national phase application of International Application No. PCT/JP2011/080389, filed Dec. 28, 2011, the content of which is incorporated herein by reference.

TECHNICAL FIELD

The present invention relates to a plug-in hybrid vehicle that can charge an electric storage device for running (hereinafter referred to as "running battery" or simply as "battery" in some cases) by an outside power supply. In particular, the present invention relates to an improvement of a method for calculating an electric power consumption rate (hereinafter referred to simply as "electric mileage" in some cases). Here, "one trip" in this description means a period after charging of the running battery (plug-in charging) by the outside power supply is completed and then running of the vehicle is started until the next plug-in charging is started.

BACKGROUND ART

In recent years, from the viewpoint of environmental protection, emission reduction of exhaust gas from an internal combustion engine (hereinafter referred to as "engine" in some cases) mounted on a vehicle and improvement in fuel consumption rate (fuel consumption) are desired. As a vehicle that satisfies these requirements, a hybrid vehicle on which a hybrid system is mounted has been put into practical use. The hybrid vehicle includes an engine such as a gasoline engine and a diesel engine and a running motor (for example, constituted by a motor-generator or a motor). The running motor is driven by electric power generated due to the output of the engine or by electric power stored in a running battery. The hybrid vehicle runs using one or both of the engine and the running motor as a running drive-force source.

In recent years, a hybrid vehicle (what is called a plug-in hybrid vehicle) that can charge the running battery for supplying electric power to the running motor by electric power from a power supply (outside power supply) outside of the vehicle, for example, a household power supply is being developed.

This plug-in hybrid vehicle is designed on the assumption of running preferentially using the electric power from the running battery, in order to significantly improve the fuel consumption rate. For example, as disclosed in Patent Literature 1 and Patent Literature 2 below, the running mode of the plug-in hybrid vehicle is set to a mode (generally referred to as "charge depleting (CD) mode" or "electric vehicle (EV) mode") that preferentially performs running using the power of the running motor alone until the electricity storage amount in the running battery is reduced up to a predetermined value. The running mode transitions to a mode (generally referred to as "charge sustain (CS) mode" or "hybrid vehicle (HV) mode") that preferentially performs running using both powers of the engine and the running motor when the electricity storage amount in the running battery becomes less than the predetermined value.

In this plug-in hybrid vehicle, for running with the power of the running motor alone in the CD mode, the possible running distance with the current electricity storage amount (remaining electricity storage amount) in the running battery is calculated and this information is displayed on a meter panel (instrument panel). More specifically, the electric mileage is calculated from the running condition in the past (relationship between the amount of electric power consumption and the running distance) (electric-mileage learning is performed). This electric mileage is a running distance per unit electric energy. Subsequently, this electric mileage is multiplied by the electricity storage amount (the electric energy that can be used until the electricity storage amount reaches the predetermined value at which the mode transitions to the CS mode) in the running battery, so as to calculate the possible running distance.

The following Patent Literature 3 discloses that, in the case where EV running (running using the power of the running motor alone) is performed, the electric energy required for this EV running and the usable electric energy are compared with each other to calculate a possible EV running distance so as to determine to continue the EV running or cause the transition to HV running (running using both powers of the engine and the running motor).

CITATION LIST

Patent Literature

PATENT LITERATURE 1: Japanese Unexamined Patent Application Publication No. 2011-51395
PATENT LITERATURE 2: Japanese Unexamined Patent Application Publication No. 2011-225097
PATENT LITERATURE 3: Japanese Unexamined Patent Application Publication No. 2010-280250

SUMMARY OF INVENTION

Technical Problem

For calculation of the electric mileage as described above, when the engine is driven, it is necessary to calculate the charge amount in the case where the battery is charged partially using the workload of the engine or the power of the engine for electric generation of the motor-generator. Thus, the calculation of the electric mileage might become complicated or sufficient accuracy might not be obtained. Accordingly, this calculation of the electric mileage (including the case where only information (an amount of electric power consumption and a running distance) for calculating the electric mileage is acquired) is preferred to be performed based on the amount of electric power consumption in the case where the vehicle is running while the engine is stopped and the running distance obtained by this consumed electric power. Therefore, during running in the CD mode (especially, during engine stop in this CD mode), the information (the amount of electric power consumption and the running distance) for calculating the electric mileage is acquired. During running in the CS mode, this information for calculating the electric mileage is not acquired. This is because the engine is being driven in most of the running period in the CS mode.

However, in the case where the electric mileage is thus calculated using only the information (the amount of electric power consumption and the running distance) acquired during running in the CD mode, the inventors of the present invention have found that the following problem may occur.

The following specifically describes this problem using FIG. 9. FIG. 9 is a graph illustrating examples of: the temporal change in electricity storage amount (remaining electricity storage amount) SOC in the battery in the case where the running mode switches between the CD mode and the CS mode; and the temporal change in trip electric mileage in the case where the electric mileage (the electric mileage up to this time in this trip, which is referred to as "trip electric mileage" or "virtual trip electric mileage" in some cases) is assumed to be calculated from the information for the amount of electric power consumption and the running distance in each time point.

In the case where the electricity storage amount SOC is equal to or more than a predetermined amount (threshold value in the graph), the CD mode is selected. On the other hand, in the case where the electricity storage amount SOC reaches a value less than the threshold value, the CS mode is selected. Even after the electricity storage amount SOC is once reduced to a value less than the threshold value, when the electricity storage amount SOC is increased up to a predetermined amount (CD-mode resetting value in the graph) due to a regeneration operation of the motor-generator afterward, the mode is reset to the CD mode.

As illustrated in FIG. 9, in the period (especially, during engine stop) in which running in the CD mode is continued, the acquisition of the information for calculating the electric mileage is performed. Afterward, when the electricity storage amount SOC becomes less than the threshold value, the mode is switched to the CS mode (at the timing TA in the graph). In this CS mode, as described above, the acquisition of the information for calculating the electric mileage is not performed. During running in this CS mode, in a running state where the electric mileage becomes relatively low, for example, during running on an uphill road, the electricity storage amount SOC is not increased up to the CD-mode resetting value and the CS mode is continued (for example, the period Tx in the graph denotes the period during the running on the uphill road). In contrast, during running in the CS mode, in a running state where the electric mileage becomes relatively high (becomes high due to the regeneration operation of the motor-generator or similar reason), for example, during running on a downhill road, the electricity storage amount SOC is increased up to the CD-mode resetting value and the mode is reset to the CD mode (at the timing TB in the graph). Here, in FIG. 9, the period Ty denotes the period during the running on the downhill road. Here, the timing TC in the graph is timing when the electricity storage amount SOC becomes less than the threshold value again and the mode is switched to the CS mode.

As described above, in the case where the running mode is switched in association with the change of the electricity storage amount SOC, running in the CD mode is performed after running of the vehicle is started until the timing TA in the graph and the information for calculating the electric mileage is acquired. Thus, an appropriate trip electric mileage can be calculated for this period.

However, during the period from the timing TA to the timing TB in the graph, running in the CS mode is performed. Accordingly, the information for calculating the electric mileage is not acquired. In this period, if running in which the electric mileage is deteriorated is performed, the deterioration is not reflected to the trip electric mileage to be calculated. For example, as described above, after running on the uphill road in the CS mode (in the period Tx in the graph), the running transitions to running on the downhill road while the CS mode is maintained. Due to the regeneration operation of the motor-generator, the electricity storage amount SOC is increased up to the CD-mode resetting value, and the mode is reset to the CD mode (at the timing TB). In this case, only the information (the information for calculating the electric mileage) after resetting of this CD mode is acquired. Accordingly, the trip electric mileage after resetting of this CD mode is calculated as a trip electric mileage better than the appropriate electric mileage. That is, the trip electric mileage is calculated without reflecting the electric mileage (actually, the deteriorated electric mileage) during running on the uphill road. Therefore, this calculated trip electric mileage has an error to have a better value with respect to the appropriate value. Thus, there is a possibility that the possible running distance (the possible distance for running using the current electricity storage amount in the running battery) cannot be accurately obtained (an error to have a longer possible running distance occurs). This error is caused by the state where the increased potential energy of the vehicle due to the power of the engine during running on the uphill road is used during running on the downhill road.

The present invention has been made in view of these points, it is an object of the present invention to provide a plug-in hybrid vehicle that can improve the calculation accuracy of the electric mileage.

Solutions to the Problems

Principles in Solving the Problems of the Invention

As the principles in solving the problems of the present invention to achieve the object, in electric-mileage learning of a plug-in hybrid vehicle, in the case where running using both powers of an electric machine and an internal combustion engine is performed and then running using the power of the electric machine alone is performed, it is determined that an error might be included in an electric power consumption rate to be calculated for this running period using the power of the electric machine alone. Thus, this electric power consumption rate in the running period using the power of the electric machine alone is not reflected to the electric-mileage learning.

Means to Solve Problems

Specifically, the present invention is premised on a plug-in hybrid vehicle that includes: an internal combustion engine configured to output a power for running; and an electric machine configured to output a power for running. The plug-in hybrid vehicle is configured to run in a first running mode and in a second running mode. The first running mode preferentially causes running using the power of the electric machine alone. The second running mode preferentially causes running using both the powers of the electric machine and the internal combustion engine. The plug-in hybrid vehicle is configured to learn of an electric power consumption rate by calculating an electric power consumption rate in the first running mode in which an electric power stored in an electric storage device is used. The electric storage device is chargeable from an outside power supply. In a case where running in the second running mode is performed after running in the first running mode is performed, the plug-in hybrid vehicle is configured to perform calculation of the electric power consumption rate or acquisition of information for calculating the electric power consumption rate only for a running period in the first running mode before the running in the second running mode, and not to perform the calculation of the electric power consumption rate or the acquisition of information for calculating the electric power consumption rate for a running period in the first running mode even when the running in the first running mode is performed after the running in the second running mode is performed.

Here, a concept of "the first running mode being configured to preferentially cause running using the power of the electric machine alone" includes not only a mode that allows switching between the running using the power of the electric machine alone and the running using both the powers of the electric machine and the internal combustion engine and that preferentially causes the running using the power of the electric machine alone, but also a mode in which the running using the power of the electric machine alone is always performed (with a priority of 100%). Similarly, a concept of "the second running mode being configured to preferentially cause running using both the powers of the electric machine and the internal combustion engine" includes not only a mode that allows switching between the running using the power of the electric machine alone and the running using both the powers of the electric machine and the internal combustion engine and that preferentially causes the running using both the powers of the electric machine and the internal combustion engine, but also a mode in which the running using both the powers of the electric machine and the internal combustion engine is always performed (with a priority of 100%).

With the above-described specified matter, when the plug-in hybrid vehicle runs on an uphill road in the second running mode, the calculation value of the electric power consumption rate might have an error as described above, for example, in the case where the acquisition of information for calculating the electric power consumption rate is not performed during running in the second running mode. That is, in the case where the acquisition of information for calculating the electric power consumption rate is not performed during running in the second running mode, a better calculation value of the electric power consumption rate might be obtained compared with an appropriate value of the electric power consumption rate. Accordingly, in the means to solve problems, in the case where running in the second running mode is performed after running in the first running mode is performed, the calculation of the electric power consumption rate or the acquisition of information for calculating this electric power consumption rate is not performed for the running period in the first running mode afterward. Thus, the calculation value of the electric power consumption rate including an error is not reflected to the learning of the electric power consumption rate. This allows maintaining high accuracy for the learned value of the electric power consumption rate.

Specific utilization forms of the learned value of the electric power consumption rate obtained as described above include the following form. That is, the plug-in hybrid vehicle is configured to multiply a learned value of the electric power consumption rate obtained by the learning by a remaining electricity storage amount of the electric storage device to calculate a possible running distance for running using the power of the electric machine alone in the first running mode.

For example, notifying the possible running distance thus calculated to the driver of the vehicle ensures effective use of the learned value of the electric power consumption rate.

Specific configurations of a learning operation of the electric power consumption rate include the following configuration. The learning of the electric power consumption rate is performed such that in a period after the electric storage device is charged by the outside power supply and vehicle running is started until the electric storage device is charged next time by the outside power supply, the calculation of the electric power consumption rate or the acquisition of information for calculating the electric power consumption rate is performed only for the running period in the first running mode before the running in the second running mode is performed and the calculated electric power consumption rate is reflected to a learned value of the electric power consumption rate in a past.

As a more specific configuration of the learning operation of the electric power consumption rate, the learning of the electric power consumption rate is performed such that in a period after the electric storage device is charged by the outside power supply and vehicle running is started until the electric storage device is charged next time by the outside power supply, an electric power consumption rate calculated based on an amount of electric power consumption and a running distance in a period of running using the power of the electric machine alone in the first running mode before running in the second running mode is performed is reflected to a learned value of the electric power consumption rate in a past.

That is, the electric power consumption rate (trip electric mileage) is calculated for the period (the first running mode up to that time in the case where the second running mode is set in the course of the period) after charging of the electric storage device by the outside power supply is completed until the next charging of the electric storage device by the outside power supply is started. This calculation value is reflected to the learned value. Accordingly, calculation of the electric power consumption rate for a relatively long period (period in one trip) enhances the reliability.

Additionally, both of the first running mode and the second running mode are configured to allow switching between the running using the power of the electric machine alone and the running using both the powers of the electric machine and the internal combustion engine. Both of the first running mode and the second running mode cause the running using both the powers of the electric machine and the internal combustion engine by starting the internal combustion engine in a case where a required output reaches a predetermined required output for starting the internal combustion engine. The required output for starting the internal combustion engine in the first running mode is set to be higher than the required output for starting the internal combustion engine in the second running mode.

Furthermore, in a case where the electric energy stored in the electric storage device is equal to or more than a predetermined amount, running in the first running mode is performed. In a case where the electric energy stored in the electric storage device is less than the predetermined amount, running in the second running mode is performed.

This learning of the electric power consumption rate only for the first running mode allows appropriately obtaining the learned value of the electric power consumption rate in running using the power of the electric machine alone as a running drive-force source. This allows enhancing the calculation accuracy of the possible running distance in the case where the possible running distance is calculated by this learned value.

Advantageous Effects of Invention

With the present invention, in the case where the running using the power of the electric machine alone is performed after the running using both the powers of the electric machine and the internal combustion engine is performed in the learning of the electric power consumption rate of the plug-in hybrid vehicle, the calculation of the electric power consumption rate or the acquisition of information for calculating this electric power consumption rate is not performed in this running period in which the power of the electric machine is used alone. Thus, the calculation value of the electric power consumption rate including an error cannot be reflected to the learning of the electric power consumption rate. This allows maintaining high accuracy for the learned value of the electric power consumption rate.

DESCRIPTION OF EMBODIMENTS

Hereinafter, embodiments of the present invention will be described based on the accompanying drawings. In this embodiment, a description will be given of an example of a plug-in hybrid vehicle constituted as a front-engine front-drive (FF) hybrid vehicle that includes two motor-generators. Here, the plug-in hybrid vehicle is a hybrid vehicle on which a charging device for charging a running battery is mounted and that has a function for allowing charging also from a household power supply. Hereinafter, the plug-in hybrid vehicle is referred to simply as a "hybrid vehicle" in some cases.

Figure 1:
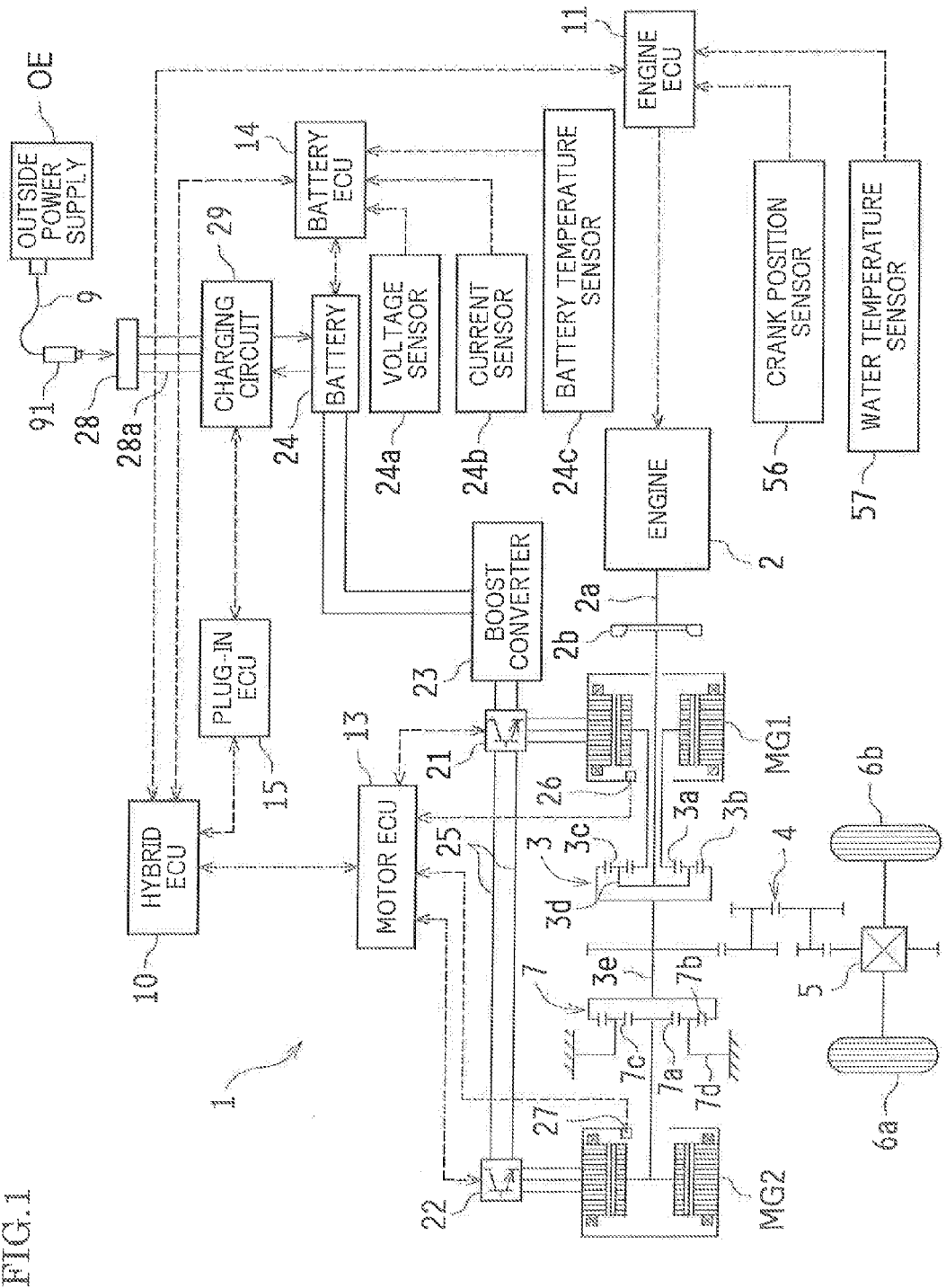
FIG. 1 is a diagram illustrating a schematic configuration of a plug-in hybrid vehicle and an outside power supply according to an embodiment.

FIG. 1 is a diagram illustrating a schematic configuration of a plug-in hybrid vehicle 1 and an outside power supply OE according to this embodiment. As illustrated in FIG. 1, the plug-in hybrid vehicle 1 includes an engine 2, a tri-axial power split mechanism 3, a first motor-generator MG1, and a second motor-generator MG2 (electric machine in the present invention) as a drive system for providing a driving force to front wheels (drive wheels) 6a and 6b. The power split mechanism 3 is coupled to a crankshaft 2a as an output shaft of the engine 2 via a damper 2b. The first motor-generator MG1 is coupled to this power split mechanism 3 and can generate electric power. The second motor-generator MG2 is coupled to a ring gear shaft 3e as a drive shaft coupled to the power split mechanism 3 via a reduction mechanism 7. These crankshaft 2a, power split mechanism 3, first motor-generator MG1, second motor-generator MG2, reduction mechanism 7, and ring gear shaft 3e constitute a power transmission system.

The above-described ring gear shaft 3e is coupled to the front wheels 6a and 6b via a gear mechanism 4 and a differential gear 5 for front wheels.

This plug-in hybrid vehicle 1 also includes a hybrid electronic control unit (hereinafter referred to as a hybrid ECU) 10 that controls the entire drive system of the vehicle.

—Engine and Engine ECU—

The engine 2 is an internal combustion engine that outputs power using hydrocarbon-based fuel such as gasoline and light oil. An engine electronic control unit (hereinafter referred to as an engine ECU) 11, which receives signals from various sensors for detecting the operating state of the engine 2, performs operation controls such as a fuel injection control, an ignition control, and an intake air amount adjustment control.

The engine ECU 11 performs communication with the hybrid ECU 10, performs operation control of the engine 2 based on a control signal from this hybrid ECU 10, and outputs data related to the operating state of the engine 2 to the hybrid ECU 10 as necessary. Here, the engine ECU 11 is coupled to a crank position sensor 56, a water temperature sensor 57, and similar sensor. The crank position sensor 56 outputs a detection signal (pulse) for every rotation of the crankshaft 2a by a certain angle. The engine ECU 11 calculates an engine rotation speed (rotation number) Ne based on the output signal from this crank position sensor 56. The water temperature sensor 57 outputs a detection signal corresponding to a cooling water temperature of the engine 2.

—Power Split Mechanism—

The power split mechanism 3 is, as illustrated in FIG. 1, constituted as a planetary gear mechanism. The planetary gear mechanism includes a sun gear 3a as an external gear, a ring gear 3b as an internal gear, a plurality of pinion gears 3c, and a planetary carrier 3d. The ring gear 3b is arranged concentrically with the sun gear 3a. The plurality of pinion gears 3c meshes with the sun gear 3a and meshes with the ring gear 3b. The planetary carrier 3d holds this plurality of pinion gears 3c to allow free rotation and revolution of the plurality of pinion gears 3c. The planetary gear mechanism provides a differential action using the sun gear 3a, the ring gear 3b, and the planetary carrier 3d as rotational elements. In this power split mechanism 3, the planetary carrier 3d is coupled to the crankshaft 2a of the engine 2. The sun gear 3a is coupled to a rotor (rotating element) of the first motor-generator MG1. Furthermore, the ring gear 3b is coupled to the above-described reduction mechanism 7 via the above-described ring gear shaft 3e.

In the power split mechanism 3 thus configured, when a reaction force torque due to the first motor-generator MG1 is input to the sun gear 3a with respect to the output torque of the engine 2 input to the planetary carrier 3d, a torque larger than the torque input from the engine 2 is generated at the ring gear 3b as an output element. In this case, the first motor-generator MG1 functions as an electric generator. When the first motor-generator MG1 functions as an electric generator, the driving force of the engine 2 input from the planetary carrier 3d is distributed to the sun gear 3a side and the ring gear 3b side corresponding to the respective gear ratios.

On the other hand, at the time of a start request for the engine 2, the first motor-generator MG1 functions as an electric motor (starter motor). The driving force of this first motor-generator MG1 is provided to the crankshaft 2a via the sun gear 3a and the planetary carrier 3d to cause cranking of the engine 2.

In the power split mechanism 3, when the rotation speed (output-shaft rotation speed) of the ring gear 3b is constant, changing the rotation speed of the first motor-generator MG1 in an increasing and decreasing manner allows continuously (steplessly) changing the rotation speed of the engine 2. That is, the power split mechanism 3 functions as a gear shifting unit.

—Reduction Mechanism—

The above-described reduction mechanism 7 includes, as illustrated in FIG. 1, a sun gear 7a as an external gear, a ring gear 7b as an internal gear, a plurality of pinion gears 7c, and a planetary carrier 7d. The ring gear 7b is arranged concentrically with this sun gear 7a. The plurality of pinion gears 7c meshes with the sun gear 7a and meshes with the ring gear 7b. The planetary carrier 7d holds this plurality of pinion gears 7c to allow free rotation of the plurality of pinion gears 7c. In this reduction mechanism 7, the planetary carrier 7d is secured to a transmission case. The sun gear 7a is coupled to a rotor (rotating element) of the second motor-generator MG2. Furthermore, the ring gear 7b is coupled to the above-described ring gear shaft 3e.

—Power Switch—

In the plug-in hybrid vehicle 1, a power switch 51 (see FIG. 2) for switching start and stop of the hybrid system is disposed. This power switch 51 is, for example, a rebounding push switch that alternately switches switch-On and switch-Off every push operation.

Here, the hybrid system is a system that employs the engine 2 and the motor-generators MG1 and MG2 as driving force sources for running and controls running of the plug-in hybrid vehicle 1 by execution of various controls including the operation control of the engine 2, driving controls of the motor-generators MG1 and MG2, a cooperative control of the engine 2 and the motor-generators MG1 and MG2, and similar control.

In the case where the power switch 51 is operated by an occupant including the driver, the power switch 51 outputs a signal (an IG-On instruction signal or an IG-Off instruction signal) corresponding to this operation, to the hybrid ECU 10. The hybrid ECU 10 starts or stops the hybrid system based on the signal output from the power switch 51 or similar signal.

Specifically, in the case where the power switch 51 is operated during stop of the plug-in hybrid vehicle 1, the hybrid ECU 10 starts the above-described hybrid system in P position, which will be described later. Accordingly, the vehicle becomes a state that allows running. Here, when the hybrid system is started during vehicle stop, the hybrid system is started in the P position. Even in an accelerator-on state, the driving force is not output. The state that allows running of the vehicle is a state where vehicle running can be controlled by an instruction signal of the hybrid ECU 10 and a state (Ready-On state) where the plug-in hybrid vehicle 1 can start moving and run when the driver presses on the accelerator. Here, the Ready-On state includes a state (a state that allows EV running) where the second motor-generator MG2 allows the plug-in hybrid vehicle 1 to start moving and run during stop of the engine 2.

The hybrid ECU 10 stops the hybrid system, for example, in the case where the power switch 51 is operated (for example, pushed for a short period of time) when the hybrid system is being started and the gear shift position is in the P position during vehicle stop.

—Motor-Generator and Motor ECU—

The motor-generators MG1 and MG2 are each constituted of a well-known synchronous generator-motor that can be driven as an electric generator and can be driven as an electric motor. The motor-generators MG1 and MG2 supply/receive electric power with a battery (electric storage device) 24 via respective inverters 21 and 22 and a boost converter 23. The respective inverters 21 and 22, the boost converter 23, and the battery 24 are coupled to one another by electric power lines 25. The electric power lines 25 are constituted as a positive electrode bus bar and a negative electrode bus bar that are shared by the respective inverters 21 and 22, and allows electric power generated by one of the motor-generators MG1 and MG2 to be consumed in the other motor. Accordingly, the battery 24 is charged and discharged due to the electric power generated any of the motor-generators MG1 and MG2 or due to the shortage of the electric power. Here, in the case where the charge and discharge of the electric power are balanced by the motor-generators MG1 and MG2, the battery 24 is not charged or discharged.

The motor-generators MG1 and MG2 are both drivingly controlled by a motor electronic control unit (hereinafter referred to as a motor ECU) 13. This motor ECU 13 receives signals required for driving controls of the motor-generators MG1 and MG2, for example, signals from an MG1 rotation speed sensor (resolver) 26 and an MG2 rotation speed sensor 27 that detect respective rotation positions of the rotors (rotating shafts) of the motor-generators MG1 and MG2 and respective phase currents that are detected by the current sensor and applied to the motor-generators MG1 and MG2. Additionally, the motor ECU 13 outputs switching control signals to the inverters 21 and 22. For example, any of the motor-generators MG1 and MG2 is drivingly controlled as an electric generator (for example, a regeneration control of the second motor-generator MG2 is performed) or drivingly controlled as an electric motor (for example, a power running control of the second motor-generator MG2 is performed). Additionally, the motor ECU 13 communicates with the hybrid ECU 10. In accordance with a control signal from this hybrid ECU 10, the motor ECU 13 drivingly controls the motor-generators MG1 and MG2 described above and outputs data related to the operating state of the motor-generators MG1 and MG2 to the hybrid ECU 10 as necessary.

—Battery and Battery ECU—

The battery 24 is formed as a battery pack constituted by a plurality of battery modules that are coupled together in series. In each battery module, a plurality of battery cells is integrated together. The voltage of the battery 24 is, for example, approximately 200 V. The battery 24 can be charged with the power supplied from an outside power supply OE outside of the vehicle, aside from the first motor-generator MG1 and the second motor-generator MG2. Here, a capacitor may be used instead of, or in addition to the battery 24.

The battery 24 is managed by a battery electronic control unit (hereinafter referred to as a battery ECU) 14. This battery ECU 14 receives signals required for managing the battery 24, for example, signals of an inter-terminal voltage from a voltage sensor 24a mounted across the terminals of the battery 24, a charge/discharge current from a current sensor 24b mounted on an electric power line 25 coupled to the output terminal of the battery 24, and a battery temperature Tb from a battery temperature sensor 24c mounted on the battery 24. The battery ECU 14 outputs data related to the state of the battery 24 to the hybrid ECU 10 via communication as necessary.

To manage the battery 24, the battery ECU 14 calculates the remaining capacity State of Charge (SOC) of electric power (electricity storage amount) based on the accumulated value of the charge/discharge current detected by the current sensor 24b. Based on the calculated remaining capacity SOC and the battery temperature Tb detected by the battery temperature sensor 24c, the battery ECU 14 calculates an input limitation Win and an output limitation Wout that are the maximum permissible powers to allow charging and discharging the battery 24. Here, the input limitation Win and the output limitation Wout of the battery 24 are set by setting respective basic values of the input limitation Win and the output limitation Wout based on the battery temperature Tb, setting a correction coefficient for input limitation and a correction coefficient for output limitation based on the remaining capacity SOC of the battery 24, and multiplying the set basic values of the input limitation Win and the output limitation Wout by the above-described correction coefficients.

Here, the battery ECU 14 may be incorporated in the hybrid ECU 10, and a power management ECU may be constituted by these members.

—Charging Device and Plug-In ECU—

As described above, the plug-in hybrid vehicle 1 can charge the battery 24 using the outside power supply OE such as a household power supply.

Specifically, the plug-in hybrid vehicle 1 includes an inlet 28 that is a power receiving portion on a side surface of the vehicle body or similar part. This inlet 28 couples to a charging circuit 29 via a power supply line 28*a*.

This charging circuit 29 converts an alternating current supplied from the outside power supply OE into a direct current so as to supplies the current to the battery 24. Additionally, this charging circuit 29 couples to a plug-in ECU 15. Between the charging circuit 29 and the plug-in ECU 15, a control signal, a signal for state of charge, and similar signal are transmitted and received. The plug-in ECU 15 also transmits and receives the control signal, the signal for state of charge, and similar signal to/from the hybrid ECU 10. The plug-in ECU 15 controls the electric energy to be charged to the battery 24 corresponding to the control signal from the hybrid ECU 10.

Figure 3:
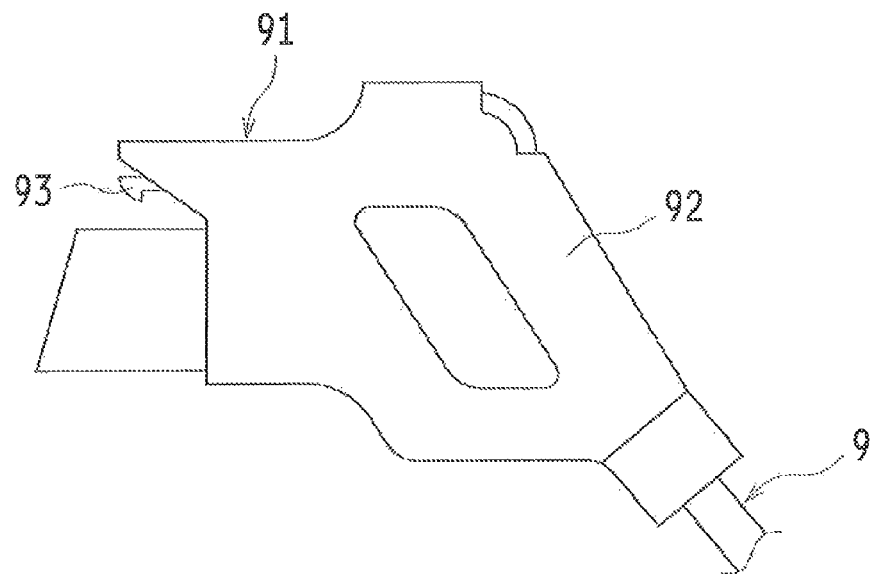
FIG. 3 is a diagram illustrating a connector disposed at a distal end of a charging cable.

The inlet 28 can couple to a connector 91 disposed at the distal end of a charging cable 9. The charging cable 9 is coupled to the outside power supply OE. This connector 91 includes, as illustrated in FIG. 3, a handle 92 and a locking hook 93. The handle 92 is gripped by a worker during a charging work. The locking hook 93 is locked with respect to the inlet 28 when the locking hook 93 is coupled to this inlet 28.

Inside of the connector 91, a switch (not illustrated) is disposed. The switch is closed in conjunction with locking of the locking hook 93 with respect to the inlet 28. When this connector 91 is coupled to (inserted into) the inlet 28, this switch is closed and the electric power from the outside power supply OE is fed to the battery 24 through the charging cable 9, the connector 91, the inlet 28, and the charging circuit 29. Additionally, when the connector 91 is thus coupled to the inlet 28 and charging of the battery 24 is started, the plug-in ECU 15 detects this charging and outputs a connector signal CNCT that is a charging-start signal to the hybrid ECU 10. As described later, the timing when this hybrid ECU 10 receives the connector signal CNCT is the calculating timing for an electric mileage (electric power consumption rate) using the amount of electric power consumption and the running distance accumulated in the previous trip (the period (the period of running up to this charging) in which the vehicle has run after the previous charging operation) and the learning timing for a learned electric mileage.

—Hybrid ECU and Control System—

Figure 2:
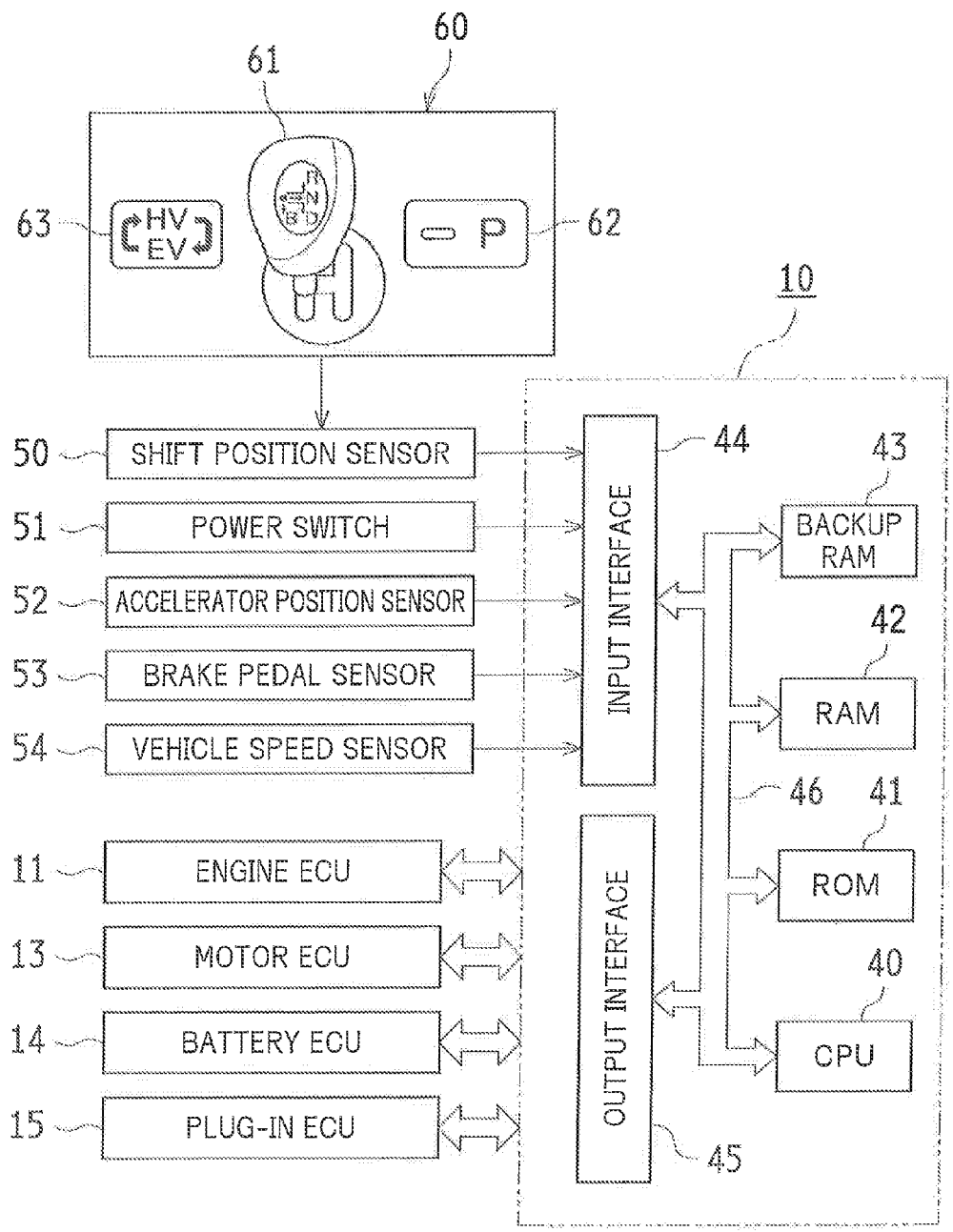
FIG. 2 is a block diagram illustrating a schematic configuration of a control system of the plug-in hybrid vehicle.

The above-described hybrid ECU 10 includes, as illustrated in FIG. 2, a central processing unit (CPU) 40, a read only memory (ROM) 41, a random access memory (RAM) 42, a backup RAM 43, and similar member. The ROM 41 stores various control programs, a map referenced during the execution of these various control programs, and similar information. The CPU 40 executes the various control programs stored in the ROM 41 and various arithmetic processings based on the map. The RAM 42 is a memory that temporarily stores the result of the arithmetic operation in the CPU 40, data received from each sensor, and similar information. The backup RAM 43 is a non-volatile memory that stores, for example, data to be stored during IG-Off and similar data.

The CPU 40, the ROM 41, the RAM 42, and the backup RAM 43 described above are coupled together via a bus 46 and are coupled to an input interface 44 and an output interface 45.

The input interface 44 is coupled to a shift position sensor 50, the above-described power switch 51, an accelerator position sensor 52, a brake pedal sensor 53, and a vehicle speed sensor 54, and similar member. The shift position sensor 50 detects the operation position of a shift lever 61 of a shift operation device 60 described later or similar position. The accelerator position sensor 52 outputs a signal corresponding to the depression amount of an accelerator pedal. The brake pedal sensor 53 outputs a signal corresponding to the depression amount of a brake pedal. The vehicle speed sensor 54 outputs a signal corresponding to a vehicle body speed.

Accordingly, the hybrid ECU 10 receives a shift position signal from the shift position sensor 50, the IG-On signal and the IG-Off signal from the power switch 51, an accelerator position signal from the accelerator position sensor 52, a brake-pedal-position signal from the brake pedal sensor 53, a vehicle speed signal from the vehicle speed sensor 54, and similar signal.

Here, a shift operation device 60 will be briefly described. The shift operation device 60 is arranged at the proximity of the driver's seat, and includes a shift lever (also referred to as a shift knob in some cases) 61, a P switch 62, and a mode selection switch 63. The shift lever 61 can be operated to be shifted. The P switch 62 can be operated to be pushed in. The mode selection switch 63 allows manually switching the running mode of the hybrid system.

The shift lever 61 sets a drive range (D range) for forward running, a brake range (B range) for forward running, a reverse range (R range) for reverse running, and a neutral range (N range) in a neutral person. In the brake range, the braking force (engine brake) becomes large when the accelerator is off. The driver can shift the shift lever 61 to a desired range. The respective positions of these D range, B range, R range, and N range are detected by the shift position sensor 50. The output signal of the shift position sensor 50 is input to the hybrid ECU 10.

The P switch 62 is for setting a parking position (P position) through a push-in operation by the driver. A push-in signal of this P switch 62 is also detected by the shift position sensor 50. In association with the push-in operation of this P switch 62, a parking ECU (not illustrated) receives a command signal from the hybrid ECU 10, and a parking lock mechanism operates to indirectly lock the front wheels 6*a* and 6*b*.

The mode selection switch 63 is for switching the running mode of the hybrid system between a "CD mode (also referred to as an EV mode)" and a "CS mode (also referred to as HV mode)" under the condition where the remaining capacity SOC of the battery 24 is equal to or more than a predetermined amount. For each push-in operation, the running mode of the hybrid system is alternately switched between the CD mode (a first running mode in the present invention) and the CS mode (a second running mode in the present invention). A push-in signal of this mode selection switch 63 is also detected by the shift position sensor 50. These CI) mode and CS mode will be described later.

On the other hand, the input interface 44 and the output interface 45 are coupled to the engine ECU 11, the motor ECU 13, the battery ECU 14, the plug-in ECU 15, and similar member. The hybrid ECU 10 transmits and receives various control signals and data to/from these engine ECU 11, motor ECU 13, battery ECU 14, and plug-in ECU 15.

The hybrid ECU 10 executes various controls on the engine 2, including throttle position control (intake air amount control), fuel injection amount control, ignition timing control, and similar control on the engine 2 based on the output signals of the various sensors. Additionally, the hybrid ECU 10 automatically switches the CD mode and the CS mode to allow running of the plug-in hybrid vehicle 1 corresponding to the vehicle speed, the accelerator position, the remaining capacity SOC of the electric power in the battery 24, and similar parameter. Furthermore, the hybrid ECU 10 performs an information acquiring operation for calculating the electric mileage, an electric-power-consumption (trip-electric-power-consumption) calculating operation using this information, and an electric-mileage learning operation, which are described later.

—Flow of Driving Force in Hybrid System—

Next, the flow of driving force in this plug-in hybrid vehicle 1 will be described. This flow of driving force is basically common to both of the CD mode and the CS mode. Here, the flow of driving force will be described without distinguishing the respective modes from each other.

The plug-in hybrid vehicle 1 calculates a torque (required torque) to be output to the drive wheels 6a and 6b based on an accelerator position Acc corresponding to the depression amount of the accelerator pedal by the driver and a vehicle speed V. Operation controls of the engine 2 and the motor-generators MG1 and MG2 are performed to ensure running by a required driving force corresponding to this required torque. Specifically, to ensure reduction in fuel consumption amount, the second motor-generator MG2 is used in an operating region where the required driving force is comparatively low to achieve the above-described required driving force. On the other hand, in an operating region where the required driving force is comparatively high, the second motor-generator MG2 is used and the engine 2 is driven to achieve the above-described required driving force using the driving force from these driving sources (running drive-force sources).

More specifically, in the case where the operational efficiency of the engine 2 is low during starting the vehicle, during low-speed running, or similar case, the running is performed with the second motor-generator MG2 alone.

On the other hand, when the driving force of the engine 2 and the driving force of the second motor-generator MG2 are used together, for example, the above-described power split mechanism 3 splits the driving force of the engine 2 into two paths (torque split). One driving force is used for direct drive (drive with direct torque) of the drive wheels 6a and 6b while the other driving force is used for driving the first motor-generator MG1 so as to perform electric generation. At this time, the electric power generated by driving the first motor-generator MG1 is used to drive the second motor-generator MG2 so as to secondary drive (drive with the electrical path) the drive wheels 6a and 6b.

Accordingly, the above-described power split mechanism 3 functions as a differential mechanism. The differential action of the power split mechanism 3 mechanically transmits a main portion of the power from the engine 2 to the drive wheels 6a and 6b, and electrically transmits the remaining portion of the power from the engine 2 using the electrical path from the first motor-generator MG1 to the second motor-generator MG2. This provides a function as an electrical-type continuously variable transmission where the gear shift ratio is electrically changed. Accordingly, without depending on the rotation speed and the torque of the drive wheels 6a and 6b (the ring gear shaft 3e), this allows freely manipulating the engine rotation speed and the engine torque and allows obtaining the operating state (the operating state on the optimal fuel consumption operation line described later) of the engine 2 with the optimized fuel consumption rate while obtaining the driving force required for the drive wheels 6a and 6b.

Figure 4:
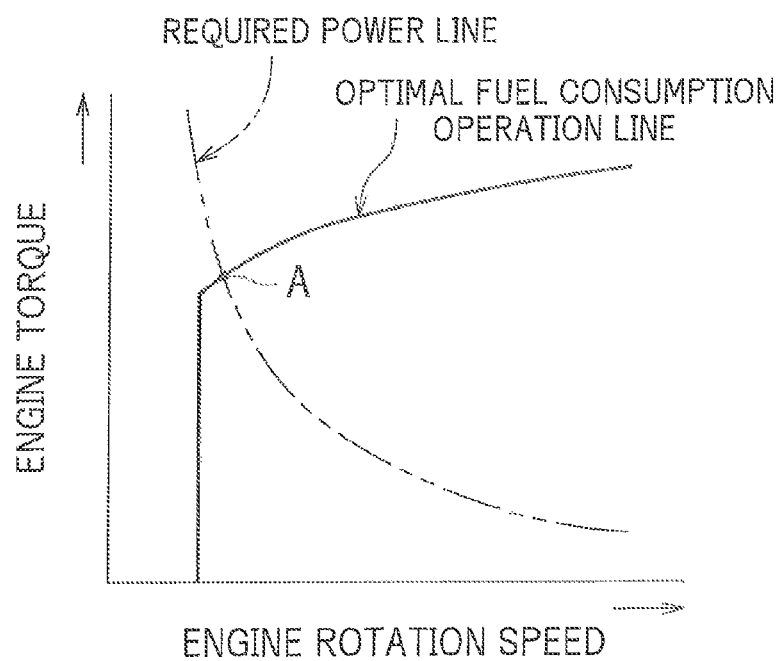
FIG. 4 is a graph describing operating point of an engine.

Specifically, a description will be given using FIG. 4. FIG. 4 is a graph illustrating the operating point of the engine 2 assuming that the horizontal axis denotes the engine rotation speed and the vertical axis denotes the engine torque. The solid line in the graph is the optimal fuel consumption operation line. The electrical gear shifting function using the power split mechanism 3 described above allows controlling the engine 2 to be the operating state on this optimal fuel consumption operation line. Specifically, the hybrid system is controlled such that the target operating point (target driving point) of the engine 2 is set to the intersection point (the point A in the graph) between a required power line (the line illustrated by the two-dot chain line in the graph) and the optimal fuel consumption operation line. The required power line is determined corresponding to the accelerator position or similar parameter.

During high-speed running, the electric power from the battery 24 is additionally supplied to the second motor-generator MG2 to increase the output of this second motor-generator MG2 so as to additionally apply a driving force (driving force assistance; power running) to the drive wheels 6a and 6b.

Furthermore, during deceleration, the second motor-generator MG2 functions as an electric generator, and then generates regenerative power and stores the recovered electric power in the battery 24. Here, in the case where the electricity storage amount (the above-described remaining capacity; SOC) of the battery 24 is reduced and charging is especially required, the output of the engine 2 is increased to increase the power generation amount by the first motor-generator MG1 so as to increase the amount of charge to the battery 24 (mainly, the operation in the CS mode). During low-speed running, a control for increasing the output of the engine 2 may be performed as necessary, for example, in the case where charging the battery 24 is required as described above, in the case where an auxiliary machine such as an air conditioner is driven, and in the case where the temperature of the cooling water for the engine 2 is increased to a predetermined temperature.

In the plug-in hybrid vehicle 1 of this embodiment, the engine 2 is stopped to improve the fuel consumption depending on the operating state of the vehicle and the state of the battery 24. Afterward, the operating state of the plug-in hybrid vehicle 1 and the state of the battery 24 are detected again so as to restart the engine 2. Accordingly, in the plug-in hybrid vehicle 1, intermittent operation (operation where engine stop and restart are repeated) of the engine 2 is performed even when the power switch 51 is in an ON position.

—CD Mode and CS Mode—

Next, the CD (EV) mode and the CS (HV) mode will be described using FIG. 5 and FIG. 6. The hybrid ECU 10 determines which mode among the CD mode and the CS mode to select corresponding to the remaining capacity (electricity storage amount) SOC of the battery 24. Specifically, in the case where the remaining capacity SOC of the battery 24 is equal to or more than a predetermined amount (a threshold value; for example, 25% of the total amount of the chargeable electric power), the CD mode is selected. The mode is set to a mode in which the running using the power of the second motor-generator MG2 alone is preferentially performed. On the other hand, in the case where the remaining capacity SOC of the battery 24 is less than the predetermined amount (threshold value), the CS mode is selected. The mode is set to a mode in which the running using both powers of the engine 2 and the second motor-generator MG2 is preferentially performed.

Figure 5:
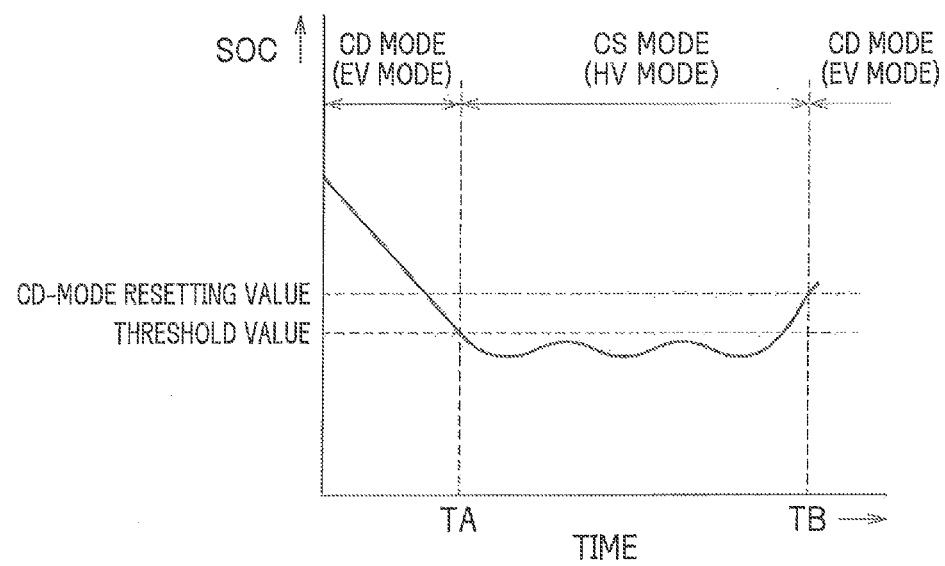
FIG. 5 is a graph describing a CD mode and a CS mode, and is a graph illustrating one example of a temporal change in SOC in the case where a running mode is switched between the CD mode and the CS mode.

Specifically, like FIG. 5 (the graph illustrating one example of a temporal change in SOC in the case where the running mode is switched between the CI) mode and the CS mode), when the running in the CD mode is continued and the electricity storage amount SOC of the battery 24 becomes less than the predetermined amount (threshold value), the mode is switched to the CS mode (at the timing TA in the graph). Subsequently, in this CS mode, the running using both the powers of the engine 2 and the second motor-generator MG2 is preferentially performed. This suppresses further reduction in electricity storage amount SOC. During running in this CS mode, when the electricity storage amount SOC is increased up to a predetermined amount (the CD-mode resetting value in the graph) due to the regeneration operation of the second motor-generator MG2 or similar reason, the mode is reset to the CD mode (the timing TB in the graph). Accordingly, corresponding to the electricity storage amount SOC of the battery 24, the hybrid ECU 10 switches the running mode between the CD mode and the CS mode.

In the case where the electricity storage amount SOC of the battery 24 is relatively large (for example, in the case where the electricity storage amount SOC is equal to or more than the threshold value), the running mode can be switched between the CD mode and the CS mode through the manual operation of the mode selection switch 63 by the driver.

In each of these CD mode and CS mode, there are the running state in which the running using the power of the second motor-generator MG2 alone is performed and the running state in which the running using both the powers of the engine 2 and the second motor-generator MG2 is performed. These CD mode and CS mode are different in required power for starting the engine 2. Specifically, the required power for starting the engine 2 in the CD mode is set to a larger value than the value of the required power for starting the engine 2 in the CS mode. Accordingly, even with the same required power (same accelerator position), the engine 2 might be started in the CD mode while the engine 2 is started in the CS mode.

Figure 6:
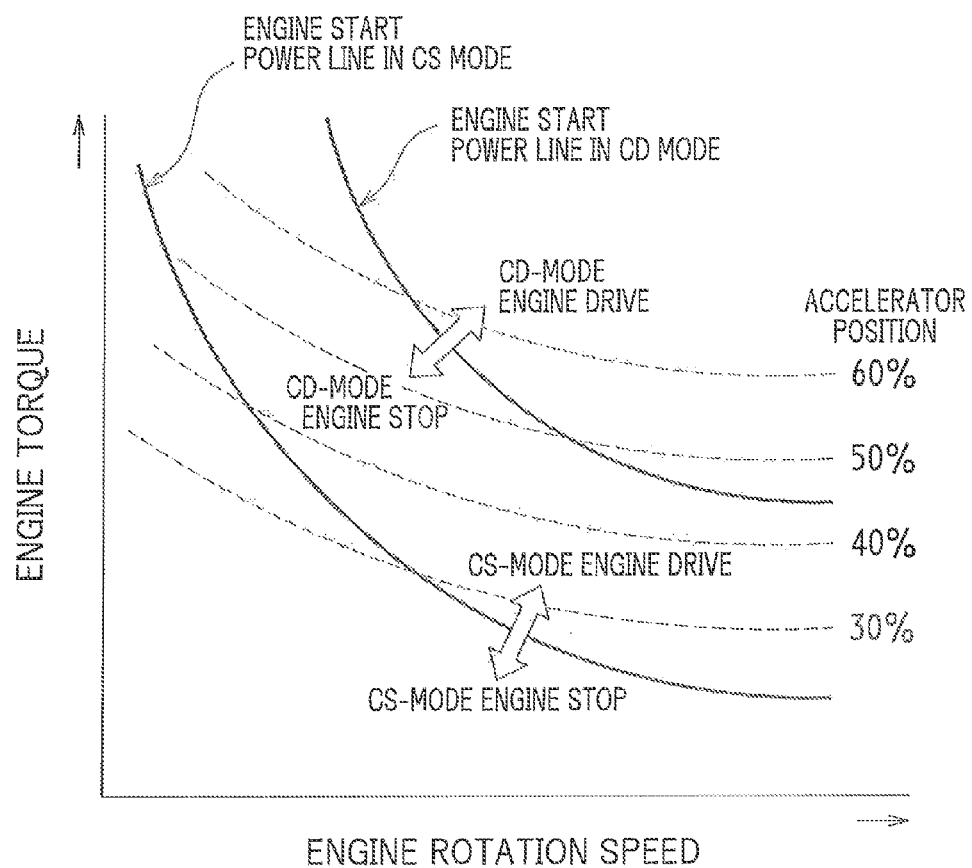
FIG. 6 is a graph illustrating one example of a map for switching the CI) mode and the CS mode and for switching engine start and stop in the respective modes.

FIG. 6 illustrates one example of a map for switching the CD mode and the CS mode and for switching engine start and stop in the respective modes. As illustrated in FIG. 6, as the required power (expressed as a product of the engine rotation speed and the engine torque) set by the accelerator position or similar parameter, an engine start power line in the CD mode and an engine start power line in the CS mode are set. The engine start power line in the CD mode is set to a higher power side compared with the engine start power line in the CS mode. For example, the engine start power line in the CD mode is set to 40 kW while the engine start power line in the CS mode is set to 20 kW. These values are not limited to these, and are set as necessary.

Accordingly, when the electricity storage amount SOC of the battery 24 is equal to or more than the predetermined amount (threshold value) and the running in the CD mode is performed, the running is performed as follows. In the case where the required power set by the accelerator position (see the dashed lines in the graph) or similar parameter is lower than the engine start power line in this CD mode, the running (engine stop) using the power of the second motor-generator MG2 alone is performed. On the other hand, in the case where the required power set by the accelerator position or similar parameter is higher than the engine start power line in this CD mode, the running using both the powers of the engine 2 and the second motor-generator MG2 is performed. Here, an operating region higher than the engine start power line in this CD mode is a relatively limited operating region (for example, during full throttle acceleration (during WOT)). Therefore, in this CD mode, the running (engine stop) using the power of the second motor-generator MG2 alone is preferentially performed.

Similarly, when the electricity storage amount SOC of the battery 24 is less than the predetermined amount (threshold value) and the running in the CS mode is performed, the running is performed as follows. In the case where the required power set by the accelerator position (see the dashed lines in the graph) or similar parameter is lower than the engine start power line in this CS mode, the running (engine stop) using the power of the second motor-generator MG2 alone is performed. On the other hand, in the case where the required power set by the accelerator position or similar parameter is higher than the engine start power line in this CS mode, the running using both the powers of the engine 2 and the second motor-generator MG2 is performed. Here, the operating region lower than the engine start power line in this CS mode is a relatively limited operating region (for example, during idling operation and during light load operation). Therefore, in this CS mode, the running using both the powers of the engine 2 and the second motor-generator MG2 is preferentially performed. During the running in this CS mode, even when the required power is lower than the engine start power line in the CS mode, in the case where the electricity storage amount SOC of the battery 24 is further reduced (in the case where the electricity storage amount SOC is reduced until the error with respect to the predetermined amount (threshold value) becomes equal to or more than a predetermined amount), the engine 2 is started for charging the battery 24 (charging due to the regenerative operation of the first motor-generator MG1).

Accordingly, in the CD mode, a control is performed such that the engine 2 is stopped as much as possible so as to cause the plug-in hybrid vehicle 1 to run using the driving force of the second motor-generator MG2 alone. This ensures improvement of the fuel consumption rate. On the other hand, in the CS mode, a control is performed such that the engine 2 is more frequently driven compared with the CD mode so as to cause the plug-in hybrid vehicle 1 to efficiently run using both the engine 2 and the second motor-generator MG2. This suppresses the reduction in electricity storage amount SOC of the battery 24 while the required power is satisfied. Here, during the running in this CS mode, in the case where the electricity storage amount SOC of the battery 24 is increased (the electricity storage amount SOC is increased due to the regeneration operation of the second motor-generator MG2 or similar reason) and this electricity storage amount SOC becomes equal to or more than the predetermined amount (the above-described CD-mode resetting value), the mode is reset to the CD mode and the engine start power line is switched from the engine start power line in the CS mode to the engine start power line in the CD mode.

—Basic Operation of Electric-Mileage Learning—

The plug-in hybrid vehicle 1 according to this embodiment learns a running distance per unit electric energy in the case where the running in the CD mode is performed as the electric mileage. This learned electric mileage is multiplied by the electricity storage amount SOC (the electricity storage amount that can be used until the electricity storage amount reaches the predetermined value at which the mode transitions to the CS mode) of the battery 24 so as to calculate a possible running distance (a possible distance for running using the driving force of the second motor-generator MG2 alone). This possible running distance is displayed on the meter panel.

The following describes the basic operation of this electric-mileage learning. This electric-mileage learning is performed by calculating the electric mileage (hereinafter referred to as "trip electric mileage" in some cases) in one trip (the period after the battery 24 is charged by the outside power supply OE and the vehicle 1 starts running until the battery 24 is charged again by the outside power supply OE) and reflecting this calculated trip electric mileage to the learned electric mileage learned in the past.

That is, the connector 91 is coupled to the inlet 28 and then the battery 24 is charged (at this time, the hybrid ECU 10 receives the connector signal CNCT from the plug-in ECU 15 so as to detect the start of charging). After completion of charging, from the time point when the power switch 51 is turned ON, an operation for accumulating the trip electric mileage in one trip (this trip) is started. Specifically, the operation accumulates the amount of electric power consumption and the running distance in the case where the running of the plug-in hybrid vehicle 1 is started and the running in the CD mode is performed and during the period in which the engine 2 is stopped (during the period in which the running using the driving force of the second motor-generator MG2 only is performed). This amount of electric power consumption is calculated by the battery ECU 14 based on information such as the charge/discharge current detected by the current sensor 24b. The calculation signal of this calculation is transmitted to the hybrid ECU 10. The running distance is calculated by the hybrid ECU 10 based on the signal from the vehicle speed sensor 54.

As described later, this accumulation of the amount of electric power consumption and the running distance is terminated in the case where the running mode is switched to the CS mode, and is temporarily stopped during the period in which the engine 2 is driven even in the CD mode.

The amount of electric power consumption and the running distance thus accumulated are stored. After the trip is ended, that is, during next charging (when the connector 91 is coupled to the inlet 28; when the hybrid ECU 10 receives the connector signal CNCT), the stored running distance is divided by the amount of electric power consumption (the proportion of the actually consumed electric energy to the total amount of the chargeable electric power in the battery 24), so as to calculate the trip electric mileage (km/%) in the previous running (previous trip).

The trip electric mileage thus obtained is reflected to the learned electric mileage (km/%) that is learned by the electric-mileage learning operation in the past, so as to update the learned electric mileage. During the next running in the CD mode, this learned electric mileage is multiplied by the electricity storage amount SOC (the electricity storage amount that can be used until the electricity storage amount reaches the predetermined value at which the mode transitions to the CS mode) of the battery 24, so as to calculate the possible running distance. This possible running distance is displayed on the meter panel. During this next running in the CD mode, the possible running distance (display on the meter panel) changes in association with the change in electricity storage amount SOC of the battery 24. For example, in the case where the electric power is consumed as energy for running and then the electricity storage amount SOC is reduced, the possible running distance becomes shorter. In contrast, in the case where the battery 24 is charged due to the regeneration operation of the second motor-generator MG2 or similar reason and then the electricity storage amount SOC is increased, the possible running distance becomes longer.

Various methods are possible as a method for reflecting the trip electric mileage that is obtained with respect to the previous trip to the learned electric mileage learned by the electric-mileage learning operation in the past so as to calculate the latest learned electric mileage. In this embodiment, the latest learned electric mileage is learned by $1/15$ moderating control. That is, assuming that the learned electric mileage learned by the electric-mileage learning operation in the past is REa, the trip electric mileage obtained with respect to the previous trip is REb, and the latest learned electric mileage is REc, the latest learned electric mileage of REc is calculated by the following formula (1).

$$REc = (14 \times REa/15) + (REb/15) \quad (1)$$

This operational expression is a formula in the case where electric power is consumed from full charge (for example, 90% of SOC) of the battery 24 up to the lower limit electricity storage amount SOC (for example, 25%) that allows running in the CD mode. Accordingly, when the actual amount of electric power consumption is smaller than that of this case (65% in the above case), the final learned electric mileage (latest learned electric mileage) is obtained while the influence rate of the trip electric mileage obtained with respect to the previous trip is set to be low corresponding to this proportion. Here, the value of the full charge and the value of the lower limit electricity storage amount SOC is not limited to these values.

—Electric-Mileage Learning Operation Corresponding to Running Mode—

Next, a description will be given of an electric-mileage learning operation corresponding to the running mode as a characteristic operation in this embodiment. In this electric-mileage learning operation, under the condition where the learned electric mileage is learned in accordance with the above-described basic operation of the electric-mileage learning, in the case where the running mode is switched from the CD mode to the CS mode, the acquisition of the information (information for calculating the trip electric mileage) for the amount of electric power consumption and the running distance is not performed afterward. That is, in the case where running in the CS mode is performed at least one time during one trip, the acquisition of the information (information for calculating the trip electric mileage) for the amount of electric power consumption and the running distance is not performed during the running period in the CD mode in the same trip afterward even when the mode is switched to the CD mode. This does not allow reflecting the amount of electric power consumption and the running distance in this CD mode to the electric-mileage learning.

Figure 7:
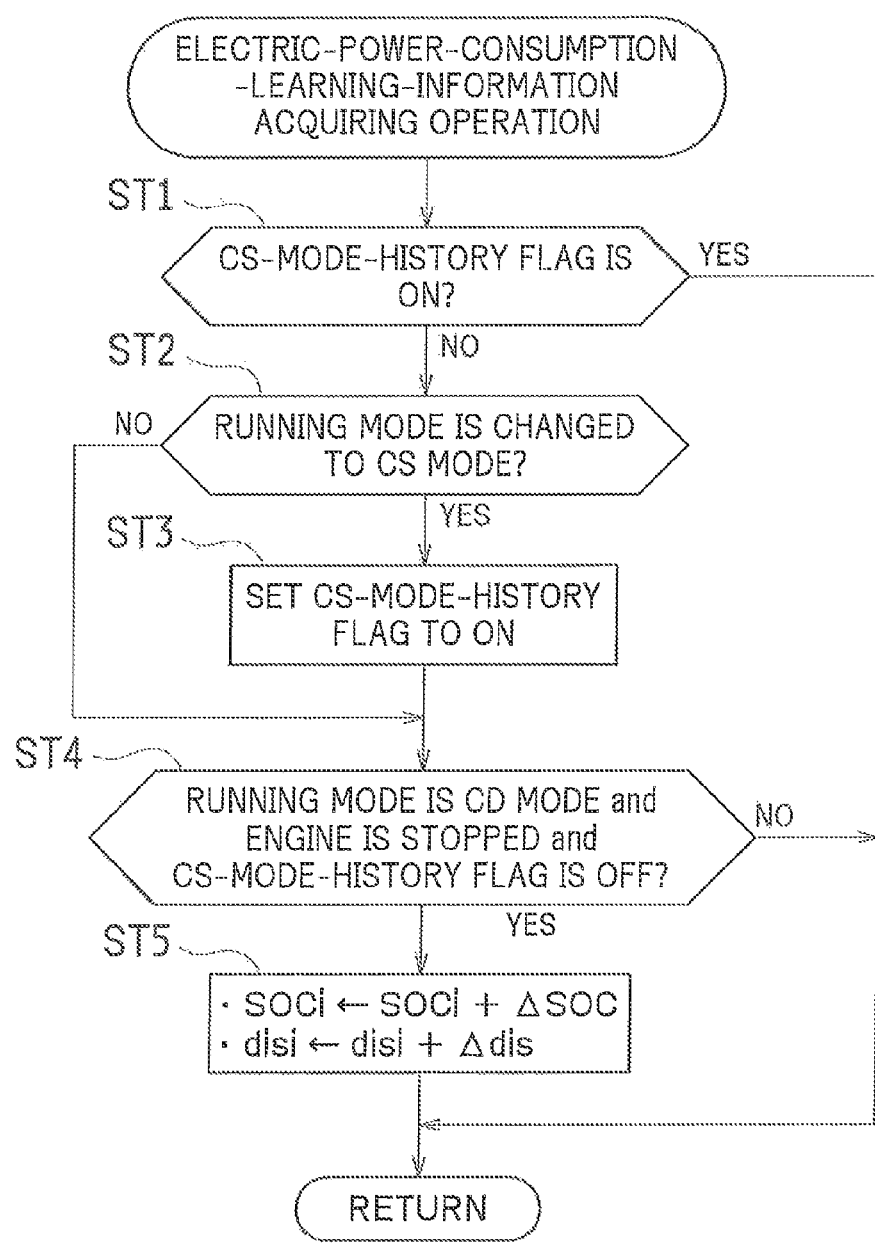
FIG. 7 is a flowchart illustrating a procedure of an electric-mileage-learning-information acquiring operation.

The following describes an electric-mileage-learning-information acquiring operation (an operation for acquiring the information for calculating the trip electric mileage) in accordance with the flowchart in FIG. 7. This flow chart illustrated in FIG. 7 illustrates an accumulation operation for the amount of electric power consumption and an accumulation operation for the running distance during one trip. That is, the amount of electric power consumption and the running distance are acquired in accordance with this flow chart. The accumulated value of the amount of electric power consumption and the accumulated value of the running distance that are finally obtained are stored in the backup RAM 43. During the next charging (plug-in charging) by the outside power supply OE, calculation of the above-described trip electric mileage (calculation of the trip electric mileage by dividing the accumulated value of the running distance by the accumulated value of the amount of electric power consumption) and learning of the learned electric mileage (learning of the latest learned electric mileage by the moderating control) are performed. This flow chart illustrated in FIG. 7 is repeatedly executed every predetermined time (for example, every several msec) during the running of the plug-in hybrid vehicle 1.

Firstly, in step ST1, it is determined whether or not a CS-mode-history flag provided with the hybrid ECU 10 is ON in advance. This CS-mode-history flag is switched from OFF to ON when running in the CS mode is performed at least one time during one trip. Even when the mode is reset to the CD mode afterward, the CS-mode-history flag is not switched to OFF. This CS-mode-history flag is switched from ON to OFF in association with the condition where the power switch 51 is turned OFF.

The timing when this CS-mode-history flag is switched from ON to OFF may be timing after the trip is ended. That is, the CS-mode-history flag is set to OFF in association with the start of the next plug-in charging.

When the plug-in hybrid vehicle 1 starts moving after the plug-in charging is performed, the CD mode is usually set (performing the plug-in charging causes the electricity storage amount SOC to be equal to or more than the threshold value, and thus the CD mode is set). Therefore, the CS-mode-history flag is set to OFF. In step ST1, the determination of NO is made, and the process transitions to step ST2.

In step ST2, it is determined whether or not the running mode of the plug-in hybrid vehicle 1 is changed to the CS mode. This determination is made based on, for example, whether or not the electricity storage amount SOC of the battery 24 is less than the threshold value.

In the case where the running mode is not changed to the CS mode, that is, the CD mode is continued, the determination of NO is made in step ST2 and then the process transitions to step ST4. In step ST4, it is determined whether or not respective conditions of: a condition (A) that the running mode of the plug-in hybrid vehicle 1 is the CD mode; a condition (B) that the engine is stopped; and a condition (C) that the CS-mode-history flag is set to OFF are all satisfied. It is determined whether or not the condition (A) is satisfied by detecting the electricity storage amount SOC of the battery 24. It is determined whether or not the condition (B) is satisfied by detecting the state of an engine start flag. The engine start flag is set to ON when an engine start request (various requests such as a torque request and a warm-up request) is generated. It is determined whether or not the condition (C) is satisfied by detecting the state of the CS-mode-history flag.

In the case where these conditions (A) to (C) are all satisfied and the determination of YES is made in step ST4, the process transitions to step ST5.

In step ST5, the information (the information for calculating the trip electric mileage) for the amount of electric power consumption and the running distance are acquired in this routine. The amount of electric power consumption and the running distance in this trip are each accumulated.

Specifically, assuming that the accumulated value of the amount of electric power consumption up to the previous routine is SOCi (set to "0" at a trip starting time point) and the amount of electric power consumption acquired in this routine (the decreased amount of the electricity storage amount SOC in this routine with respect to the electricity storage amount SOC in the previous routine) is $\Delta SOC$, the accumulated value SOCi of the amount of electric power consumption is updated based on the following formula (2).

$$SOCi \leftarrow SOCi + \Delta SOC \quad (2)$$

Assuming that the accumulated value of the running distance up to the previous routine is disi (set to "0" at the trip starting time point) and the running distance acquired in this routine (the increased amount of the running distance in this routine with respect to the running distance in the previous routine) is $\Delta dis$, the accumulated value disi of the running distance is updated based on the following formula (3).

$$disi \leftarrow disi + \Delta dis \quad (3)$$

After the accumulated value (SOCi) of the amount of electric power consumption and the accumulated value (disi) of the running distance are thus updated, the process returns.

Accordingly, during the period in which the respective conditions (A) to (C) are all satisfied, the operations in steps ST1, ST2, ST4, and ST5 are repeated. The accumulated value (SOCi) of the amount of electric power consumption and the accumulated value (disi) of the running distance are updated based on the formulas (2) and (3) every one routine. Accordingly, in the case where the trip is ended without setting the CS-mode-history flag to ON or starting the engine 2 and the next charging operation (plug-in charging) is performed, the trip electric mileage (the electric mileage in the last trip) is calculated using the updated accumulated value of the amount of electric power consumption and the updated accumulated value of the running distance in the operation for calculating the trip electric mileage.

On the other hand, in the case where the CS-mode-history flag is set to OFF (during running in the CD mode), when the engine 2 is driven, the determination of NO is made in step ST4. Thus, the acquisition of the information for the amount of electric power consumption and the running distance and the accumulation of these are temporarily stopped. Afterward, when the engine 2 is stopped (the engine 2 is stopped during running in the CD mode), the determination of YES is made again in step ST4. Accordingly, in step ST5, the acquisition of the information for the amount of electric power consumption ($\Delta SOC$) and the running distance ($\Delta dis$) and the calculation of the accumulated values (SOCi, disi) of these are resumed.

On the other hand, during the above-described acquisition of the information for the amount of electric power consumption and the running distance, or during the above-described temporal stop of the acquisition of the information for the amount of electric power consumption and the running distance in association with the driving of the engine 2, when the electricity storage amount SOC of the battery 24 becomes less than the threshold value and then the running mode is changed to the CS mode, the determination of YES is made in step ST2. In this case, in step ST3, the CS-mode-history flag is switched from OFF to ON. When the CS-mode-history flag is thus set to ON, the determination of NO is made in step ST4 and the process directly returns. That is, the process returns without performing acquisition of the information for the amount of electric power consumption and the running distance and accumulation of these in step ST5.

As described above, the CS-mode-history flag is switched from OFF to ON when running in the CS mode is performed at least one time during one trip, and is not switched to OFF even when the mode is reset to the CD mode afterward. Accordingly, when the CS-mode-history flag is set to ON, the determination of YES is made in step ST1 in the subsequent routine (the routine in the same trip) and the process directly returns. Therefore, in this trip, the acquisition of the information for the amount of electric power consumption and the running distance, and the accumulation of these are not performed afterward. That is, even when the electricity storage amount SOC of the battery 24 becomes equal to or more than the CD-mode resetting value and the mode is reset to the CD mode, the acquisition of the information for the amount of electric power consumption and the running distance, and the accumulation of these are not performed. Accordingly, only the amount of electric power consumption ($\Delta$SOC) and the running distance ($\Delta$dis) acquired in the running period in the CD mode before the running in the CS mode is performed first time, and the accumulated values (SOCi, disi) of these are set to be valid. Then, the trip electric mileage is calculated during the next charging (during the plug-in charging).

Repeating the above-described operation causes the following conditions. During the period in which the CD mode is continued in one trip (during the period in which the history of switching to the CS mode during the same trip does not exist), the acquisition of the information for the amount of electric power consumption and the running distance and the accumulation of these are continued. Accordingly, the trip electric mileage obtained from the information of these is reflected to the electric-mileage learning. On the other hand, in the case where the running mode is switched from the CD mode to the CS mode, the acquisition of the information for the amount of electric power consumption and the running distance is not performed afterward. Accordingly, the information of these is not reflected to the electric-mileage learning.

Figure 8:
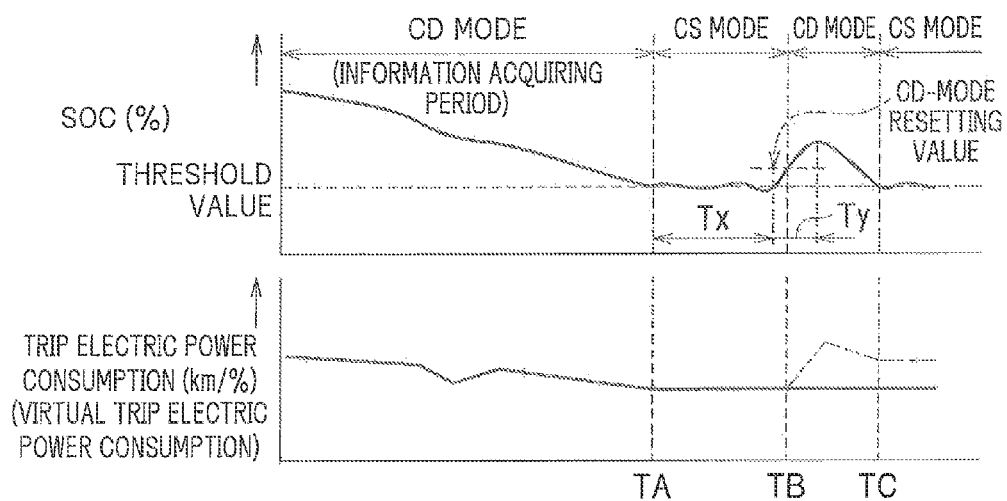
FIG. 8 is a timing chart illustrating examples of a temporal change in electricity storage amount SOC in a battery and a temporal change in trip electric mileage in the case where the running mode is switched between the CD mode and the CS mode in the embodiment.

FIG. 8 is a timing chart illustrating examples of the temporal change in electricity storage amount SOC in the battery and the temporal change in trip electric mileage in the case where the running mode is switched between the CD mode and the CS mode.

As described above, the trip electric mileage is calculated by dividing the stored accumulated value of the running distance by the accumulated value of the amount of electric power consumption when charging is started after the trip is ended (when the connector 91 is coupled to the inlet 28; when the plug-in charging is started). In FIG. 8, for ease of understanding, the value if the trip electric mileage (the trip electric mileage up to the present) is assumed to be calculated during running in the CD mode is described as a trip electric mileage in the lowest line. The trip electric mileage described here is referred to as a "virtual trip electric mileage" below.

Figure 9:
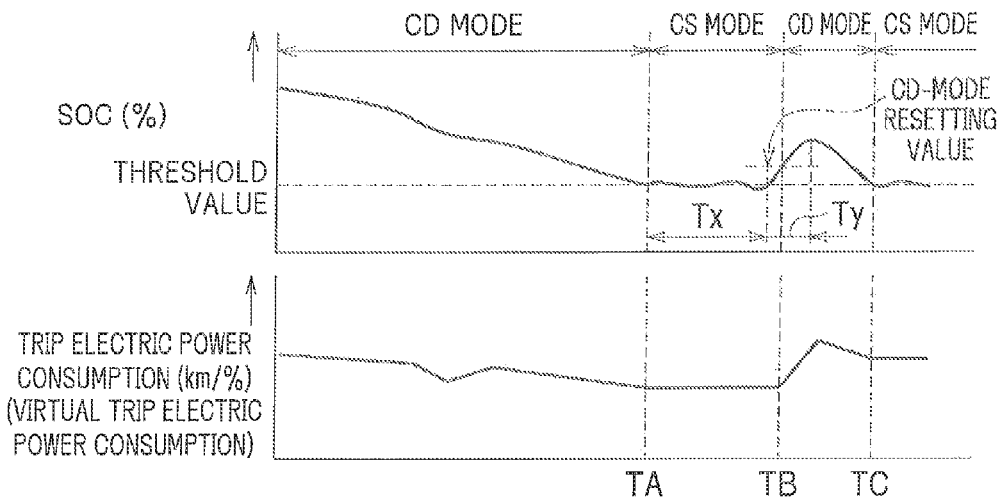
FIG. 9 is a timing chart illustrating examples of a temporal change in electricity storage amount SOC in the battery and a temporal change in trip electric mileage in the case where the running mode is switched between the CD mode and the CS mode in a conventional technique.

Here, in FIG. 8, similarly to the above-described case of FIG. 9, the period Tx in the graph denotes the period during the running on the uphill road while the period Ty denotes the period during the running on the downhill road.

When charging of the battery 24 (plug-in charging) is terminated and then running of the vehicle 1 is started, running in the CD mode is performed. That is, since the electricity storage amount SOC of the battery 24 is equal to or more than the predetermined amount (above-described threshold value), running in the CD mode is performed.

When this running in the CD mode is continued and then the electricity storage amount SOC becomes less than the threshold value, the mode is switched to the CS mode (at the timing TA in the graph). In this CS mode, as described above, the acquisition of the information for calculating the electric mileage is not performed. During running in this CS mode, the electric mileage is relatively low as a running state during the period in which the running on the uphill road is continued. Accordingly, the electricity storage amount SOC is not increased up to the CD-mode resetting value, and the CS mode is continued. Afterward, when running on the downhill road or similar method causes the running state where the electric mileage becomes relatively high (becomes high due to the regeneration operation of the second motor-generator MG2 or similar reason), the electricity storage amount SOC is increased up to the CD-mode resetting value and then the mode is reset to the CD mode (at the timing TB in the graph). Here, the timing TC in the graph is timing when the electricity storage amount SOC becomes less than the threshold value again and the mode is switched to the CS mode.

In this switching operation of the running mode in association with the change in electricity storage amount SOC, in the period (the running period in the CD mode) from the running start of the vehicle 1 to the timing TA, the acquisition of the information for the amount of electric power consumption ($\Delta$SOC) and the running distance ($\Delta$dis) and calculation of the accumulated values (SOCi, disi) of these are performed during the period in which the engine 2 is stopped.

In contrast, when running in the CS mode is started from the timing TA, the CS-mode-history flag is set to ON. Accordingly, the acquisition of the information for the amount of electric power consumption ($\Delta$SOC) and the running distance ($\Delta$dis) and the calculation of the accumulated values (SOCi, disi) of these are not performed afterward. This state is maintained even when the electricity storage amount SOC is increased up to the CD-mode resetting value in the timing TB and then the mode is reset to the CD mode.

As the change in virtual trip electric mileage after the timing TB, the solid line denotes the virtual trip electric mileage in this embodiment while the two-dot chain line denotes the virtual trip electric mileage in the conventional technique.

Thus, in the conventional technique, in the case where the mode is reset to the CD mode, the acquisition of the information for the amount of electric power consumption ($\Delta$SOC) and the running distance ($\Delta$dis), and the calculation of the accumulated values (SOCi, disi) of these are resumed. This information is used to calculate the trip electric mileage. Therefore, the calculated trip electric mileage has an error to have a better value with respect to the appropriate value. Thus, there is a possibility that the possible running distance (the possible distance for running using the current electricity storage amount in the running battery) cannot be accurately obtained (an error to have a longer possible running distance occurs). This error is caused by the state where the increased potential energy of the vehicle 1 due to the power of the engine 2 during running on the uphill road is used during running on the downhill road.

In contrast, in this embodiment, in the case where the running mode is switched from the CD mode to the CS mode, the acquisition of the information for the amount of electric power consumption ($\Delta$SOC) and the running distance ($\Delta$dis), and the calculation of the accumulated values (SOCi, disi) of these are not performed afterward. Thus, only the information excluding the error is used for calculating the trip electric mileage. This eliminates the situation that the calculation value of the trip electric mileage including the error is reflected to learning of the electric power consumption rate, thus maintaining high accuracy for the learned value of the electric-mileage.

Here, in the actual electric-mileage learning, as illustrated in FIG. 8, in the case where the trip is ended in the state where the electricity storage amount SOC of the battery 24 is equal to or less than the threshold value (the lower limit electricity storage amount SOC that allows running in the CD mode) and then the plug-in charging is performed, the latest learned electric mileage is learned by $1/15$ moderating control based on the formula (1). In the case where the trip is ended in the state where the electricity storage amount SOC of the battery 24 is higher than the threshold value and then the plug-in charging is performed, the latest learned electric mileage is learned corresponding to the proportion (the actually used electric energy/the electric energy used in the case where the electricity storage amount SOC is reduced up to the threshold value). For example, in the case where the actually used electric energy (the electric energy used in one trip) is ½ of the electric energy in the case where the electric power is consumed from the full charge of the battery 24 up to the lower limit electricity storage amount SOC (above-described threshold value) that allows running in the CD mode, the latest learned electric mileage is calculated based on the following formula (4).

$$REc=(29\times REa/30)+(REb/30) \quad (4)$$

Here, as described above, assume that REa is the learned electric mileage learned by the electric-mileage learning operation in the past, REb is the trip electric mileage obtained with respect to the previous trip, and REc is the latest learned electric mileage.

Other Embodiments

In the above-described embodiment, the description is made on the example where the present invention is applied to control over the front-engine front-drive (FF) plug-in hybrid vehicle 1; however, the present invention is not limited to this configuration. The present invention is also applicable to control over a front-engine rear-drive (FR) plug-in hybrid vehicle or control over a four-wheel-drive plug-in hybrid vehicle.

In the above-described embodiment, the examples where the present invention is applied to the control over the plug-in hybrid vehicle 1 on which two generator-motors of the first motor-generator MG1 and the second motor-generator MG2 are mounted has been described. However, the present invention is applicable to the control over a plug-in hybrid vehicle on which one generator-motor is mounted or a plug-in hybrid vehicle on which three or more generator-motors are mounted.

In the above-described embodiment, the running mode is switched between the CD mode and the CS mode. In the CD mode, the running using the power of the second motor-generator MG2 alone (engine stop) is preferentially performed. In the CS mode, the running using both the powers of the engine 2 and the second motor-generator MG2 is preferentially performed. That is, in both modes, there are the running state where the running using the power of the second motor-generator MG2 alone is performed and the running state where the running using both the powers of the engine 2 and the second motor-generator MG2 is performed. The present invention is not limited to this. The present invention is applicable to a plug-in hybrid vehicle in which these modes are not provided, and the running state where the running using the power of the second motor-generator MG2 alone is performed and running state where the running using both the powers of the engine 2 and the second motor-generator MG2 is performed are switched simply corresponding to the required driving force or similar parameter. In this case, when the running state is switched at least one time from the running state where the running using the power of the second motor-generator MG2 alone is performed to the running state where the running using both the powers of the engine 2 and the second motor-generator MG2 is performed, the acquisition of the information for the amount of electric power consumption and the running distance and the accumulation of these are not performed afterward even after the running state transitions to the running state where the running using the power of the second motor-generator MG2 alone is performed.

Furthermore, in this embodiment, the amount of electric power consumption and the running distance are each accumulated during the trip and the trip electric mileage is calculated when the next charging is started. Thus, the electric-mileage learning is performed. The present invention is not limited to this. The present invention is applicable to the case where the trip electric mileage is sequentially calculated while the amount of electric power consumption and the running distance are each accumulated during the trip.

INDUSTRIAL APPLICABILITY

The present invention is applicable to a control for calculating an electric mileage in a plug-in hybrid vehicle so as to calculate a possible running distance based on a remaining capacity of a battery.

DESCRIPTION OF REFERENCE SIGNS 1 plug-in hybrid vehicle
2 engine (internal combustion engine)
10 hybrid ECU
11 engine ECU
13 motor ECU
14 battery ECU
15 plug-in ECU
24 battery (electric storage device)
28 inlet
54 vehicle speed sensor
91 connector
MG1 first motor-generator
MG2 second motor-generator (electric machine)
OE outside power supply

The invention claimed is:
1. A plug-in hybrid vehicle, comprising:
an internal combustion engine configured to output a power for running; and
an electric machine configured to output a power for running, wherein
the plug-in hybrid vehicle is configured to run in a first running mode and in a second running mode, the first running mode preferentially causing running using the power of the electric machine alone, the second running mode preferentially causing running using both the powers of the electric machine and the internal combustion engine,
the plug-in hybrid vehicle is configured to learn of an electric power consumption rate by calculating an electric power consumption rate in the first running mode in which an electric power stored in an electric storage device is used, the electric storage device being chargeable from an outside power supply, and
in a case where running in the second running mode is performed after running in the first running mode is performed, the plug-in hybrid vehicle is configured to perform calculation of the electric power consumption rate or acquisition of information for calculating the electric power consumption rate only for a running period in the first running mode before the running in the second running mode, and not to perform the calculation of the electric power consumption rate or the acquisition of information for calculating the electric power consumption rate for a running period in the first running mode even when the running in the first running mode is performed after the running in the second running mode is performed.

2. The plug-in hybrid vehicle according to claim 1, wherein the plug-in hybrid vehicle is configured to multiply a learned value of the electric power consumption rate obtained by the learning by a remaining electricity storage amount of the electric storage device to calculate a possible running distance for running using the power of the electric machine alone in the first running mode.

3. The plug-in hybrid vehicle according to claim 1, wherein the learning of the electric power consumption rate is performed such that in a period after the electric storage device is charged by the outside power supply and vehicle running is started until the electric storage device is charged next time by the outside power supply, an electric power consumption rate calculated based on an amount of electric power consumption and a running distance in a period of running using the power of the electric machine alone in the first running mode before running in the second running mode is performed is reflected to a learned value of the electric power consumption rate in a past.

4. A plug-in hybrid vehicle, comprising:
an internal combustion engine configured to output a power for running;
an electric machine configured to output a power for running; and
an electric storage device chargeable from an outside power supply, wherein
the plug-in hybrid vehicle is configured to run in a first running mode and in a second running mode, the first running mode being performed in a case where an electric energy stored in the electric storage device is equal to or more than a predetermined amount, the second running mode being performed in a case where the electric energy stored in the electric storage device is less than the predetermined amount,
both of the first running mode and the second running mode allow switching between the running using the power of the electric machine alone and the running using both the powers of the electric machine and the internal combustion engine, both of the first running mode and the second running mode causing the running using both the powers of the electric machine and the internal combustion engine by starting the internal combustion engine in a case where a required output reaches a predetermined required output for starting the internal combustion engine,
the required output for starting the internal combustion engine in the first running mode is set to be higher than the required output for starting the internal combustion engine in the second running mode,
the plug-in hybrid vehicle is configured to learn of an electric power consumption rate by calculating an electric power consumption rate in the first running mode, and
in a running period after the electric storage device is charged by the outside power supply and vehicle running is started until the electric storage device is charged next time by the outside power supply, in a case where running in the second running mode is performed after running in the first running mode is performed, the plug-in hybrid vehicle is configured to perform the calculation of the electric power consumption rate or the acquisition of information for calculating the electric power consumption rate only for the running period in the first running mode before the running in the second running mode is performed, and reflect the calculated electric power consumption rate to a learned value of the electric power consumption rate in a past so as to perform the learning of the electric power consumption rate, while the plug-in hybrid vehicle is configured not to perform the calculation of the electric power consumption rate or the acquisition of information for calculating the electric power consumption rate for a running period in the first running mode even when the running in the first running mode is performed after the running in the second running mode is performed.

5. The plug-in hybrid vehicle according to claim 4, wherein the plug-in hybrid vehicle is configured to multiply a learned value of the electric power consumption rate obtained by the learning by a remaining electricity storage amount of the electric storage device to calculate a possible running distance for running using the power of the electric machine alone in the first running mode.

6. The plug-in hybrid vehicle according to claim 4, wherein the learning of the electric power consumption rate is performed such that in a period after the electric storage device is charged by the outside power supply and vehicle running is started until the electric storage device is charged next time by the outside power supply, an electric power consumption rate calculated based on an amount of electric power consumption and a running distance in a period of running using the power of the electric machine alone in the first running mode before running in the second running mode is performed is reflected to a learned value of the electric power consumption rate in a past.

7. A plug-in hybrid vehicle, comprising:
an internal combustion engine configured to output a power for running;
an electric machine configured to output a power for running; and
an electric storage device chargeable from an outside power supply, wherein
the plug-in hybrid vehicle is configured to run in a CD mode and in a CS mode and learn of an electric power consumption rate by calculating an electric power consumption rate in the CD mode in which an electric power stored in the electric storage device is used, and
in a running period after the electric storage device is charged by the outside power supply and vehicle running is started until the electric storage device is charged next time by the outside power supply, in a case where running in the CS mode is performed after running in the CD mode is performed, the plug-in hybrid vehicle is configured to perform the calculation of the electric power consumption rate or the acquisition of information for calculating the electric power consumption rate only for the running period in the CD mode before the running in the CS mode is performed, and reflect the calculated electric power consumption rate to a learned value of the electric power consumption rate in a past so as to perform the learning of the electric power consumption rate, while the plug-in hybrid vehicle is configured not to perform the calculation of the electric power consumption rate or the acquisition of information for calculating the electric power consumption rate for a running period in the CD mode even when the running in the CD mode is performed after the running in the CS mode is performed.

8. A plug-in hybrid vehicle, comprising:
an internal combustion engine configured to output a power for running;
an electric machine configured to output a power for running; and an electric storage device chargeable from an outside power supply, wherein the plug-in hybrid vehicle is configured to run in a first running mode using the power of the electric machine alone and run in a second running mode using both the powers of the electric machine and the internal combustion engine, the first running mode being performed in a case where the electric energy stored in the electric storage device is equal to or more than a predetermined amount, the second running mode being performed in a case where the electric energy stored in the electric storage device is less than the predetermined amount, the plug-in hybrid vehicle is configured to learn of an electric power consumption rate by calculating an electric power consumption rate in the first running mode in which an electric power stored in the electric storage device is used, and in one trip that is a period after plug-in charging as charging of the electric storage device by the outside power supply is completed and then running of the vehicle is started until next plug-in charging is started, in a case where the first running mode is continued and a history of switching to the second running mode does not exist during a same trip, the plug-in hybrid vehicle is configured to: perform acquisition of information for an amount of electric power consumption and a running distance, continue accumulation of the information to obtain a trip electric-mileage, and reflect the trip electric-mileage to an electric-mileage learning, while in a case where a running mode is switched from the first running mode to the second running mode during the same trip, the plug-in hybrid vehicle is configured not to perform acquisition of information for the amount of electric power consumption and the running distance during the same trip afterward so as not to reflect the information to the electric-mileage learning.

9. The plug-in hybrid vehicle according to claim 8, wherein the plug-in hybrid vehicle is configured to multiply a learned value of the electric power consumption rate obtained by the learning by a remaining electricity storage amount of the electric storage device to calculate a possible running distance for running using the power of the electric machine alone in the first running mode.

10. The plug-in hybrid vehicle according to claim 8, wherein the learning of the electric power consumption rate is performed such that in a period after the electric storage device is charged by the outside power supply and vehicle running is started until the electric storage device is charged next time by the outside power supply, an electric power consumption rate calculated based on an amount of electric power consumption and a running distance in a period of running using the power of the electric machine alone in the first running mode before running in the second running mode is performed is reflected to a learned value of the electric power consumption rate in a past.

* * * * *